(12) United States Patent
Tamizhmani

(10) Patent No.: US 11,068,333 B2
(45) Date of Patent: Jul. 20, 2021

(54) DEFECT ANALYSIS AND REMEDIATION TOOL

(71) Applicant: Bank of America Corporation, Charlotte, NC (US)

(72) Inventor: Aravinthane Tamizhmani, Chennai (IN)

(73) Assignee: Bank of America Corporation, Charlotte, NC (US)

(*) Notice: Subject to any disclaimer, the term of this patent is extended or adjusted under 35 U.S.C. 154(b) by 179 days.

(21) Appl. No.: 16/450,573

(22) Filed: Jun. 24, 2019

(65) Prior Publication Data
US 2020/0401472 A1    Dec. 24, 2020

(51) Int. Cl.
*G06F 11/30* (2006.01)
*G06F 11/07* (2006.01)
*G06F 17/16* (2006.01)
*G06Q 10/06* (2012.01)

(52) U.S. Cl.
CPC ...... *G06F 11/0793* (2013.01); *G06F 11/0709* (2013.01); *G06F 11/079* (2013.01); *G06F 11/0781* (2013.01); *G06F 17/16* (2013.01); *G06Q 10/0639* (2013.01)

(58) Field of Classification Search
CPC ............. G06F 11/0793; G06F 11/0781; G06F 11/079; G06Q 10/0639
See application file for complete search history.

(56) References Cited

U.S. PATENT DOCUMENTS

| | | |
|---|---|---|
| 5,966,541 A | 10/1999 | Agarwal |
| 7,085,690 B2 | 8/2006 | Sale |
| 7,100,082 B2 | 8/2006 | Little |
| 7,100,083 B2 | 8/2006 | Little |
| 7,133,856 B2 | 11/2006 | Huang et al. |
| 7,146,536 B2 | 12/2006 | Bingham |
| 7,318,051 B2 | 1/2008 | Weston et al. |
| 7,421,371 B2 | 9/2008 | Segers |
| 7,640,457 B2 | 12/2009 | Erwin |
| 7,861,120 B2 | 12/2010 | Cui |
| 7,873,898 B2 | 1/2011 | Bhamidipaty |
| 7,933,420 B2 | 4/2011 | Copley |
| 8,024,707 B2 | 9/2011 | Manglik |
| 8,068,616 B2 | 11/2011 | Copley |
| 8,073,659 B2 | 12/2011 | Gugaliya et al. |

(Continued)

*Primary Examiner* — Matthew M Kim
*Assistant Examiner* — Kyle Emanuele
(74) *Attorney, Agent, or Firm* — Michael A. Springs

(57) ABSTRACT

An apparatus includes a database and a processor. The database stores a set of inputs and a set of outputs, some of which are labeled as inaccurate. The processor forms a matrix of basis functions to represent the system that generated the outputs, such that a solution exists to the equations formed by multiplying the matrix by a vector of the inputs and setting this equal to a vector of the outputs. The processor reduces the number of adjustable parameters in a first row of the matrix associated with a first inaccurate output and determines that a solution to the matrix equation still exists. The processor reduces the number of adjustable parameters in a second row of the matrix associated with a second inaccurate output and determines that a solution to the matrix equation no longer exists. The processor sends the first output as a remediation candidate to an administrator.

17 Claims, 4 Drawing Sheets

(56) References Cited

U.S. PATENT DOCUMENTS

| | | |
|---|---|---|
| 8,140,905 B2 | 3/2012 | Beaty |
| 8,175,994 B2 | 5/2012 | Collard |
| 8,244,652 B2 | 8/2012 | Menahem et al. |
| 8,245,081 B2 | 8/2012 | Colbert |
| 8,255,740 B2 | 8/2012 | Kamath |
| 8,522,082 B1 | 8/2013 | Moore |
| 8,776,170 B2 | 7/2014 | Bezilla |
| 8,914,674 B2 | 12/2014 | Shah |
| 8,930,775 B2 | 1/2015 | Notohardjono |
| 8,972,821 B2 | 3/2015 | Xiao |
| 8,996,452 B2 * | 3/2015 | Danciu .................. G06Q 10/06 707/603 |
| 9,026,646 B2 | 5/2015 | Whitlock |
| 9,043,658 B1 | 5/2015 | Marr |
| 9,104,574 B2 | 8/2015 | Dechovich |
| 9,298,543 B2 | 3/2016 | Wang |
| 9,304,850 B1 | 4/2016 | Whitlock |
| 9,449,278 B2 | 9/2016 | Davlos |
| 9,471,594 B1 | 10/2016 | Schnegelberger |
| 9,519,545 B2 | 12/2016 | Niewczas |
| 9,703,624 B2 * | 7/2017 | Purushothaman .. G06F 11/0748 |
| 10,162,698 B2 | 12/2018 | Mah |
| 2005/0138031 A1 | 6/2005 | Wefers |
| 2008/0282111 A1 | 11/2008 | Li |
| 2009/0306943 A1 | 12/2009 | Abdel-Khalik et al. |
| 2011/0060945 A1 | 3/2011 | Leprince |
| 2011/0093955 A1 | 4/2011 | Chen |
| 2012/0042195 A1 | 2/2012 | Marinelli |
| 2012/0265872 A1 | 10/2012 | Chilton |
| 2012/0310850 A1 | 12/2012 | Zeng |
| 2014/0208167 A1 | 7/2014 | Krampen |
| 2014/0222521 A1 | 8/2014 | Chait |
| 2014/0310222 A1 | 10/2014 | Davlos |
| 2015/0088596 A1 | 3/2015 | Civil |
| 2015/0149609 A1 | 5/2015 | Zou |
| 2015/0309826 A1 | 10/2015 | Kirubanandam |
| 2016/0041899 A1 | 2/2016 | Cragun |
| 2016/0239374 A1 | 8/2016 | Schnegelberger |
| 2017/0102997 A1 | 4/2017 | Purushothaman |
| 2017/0186019 A1 | 6/2017 | Loeb |

* cited by examiner

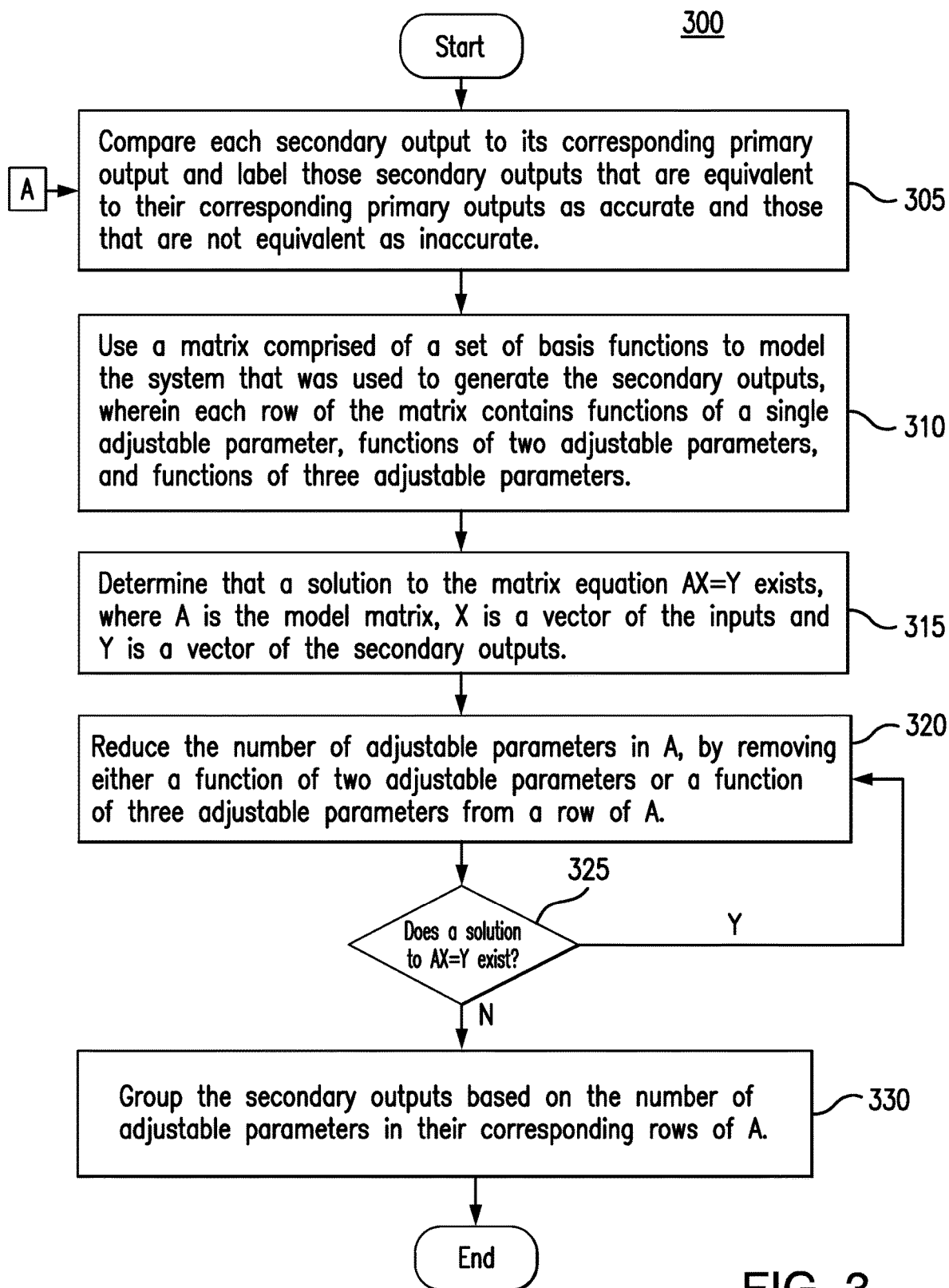

DEFECT ANALYSIS AND REMEDIATION TOOL

TECHNICAL FIELD

This disclosure relates generally to data storage and handling systems and more specifically to root cause analysis and defect remediation.

BACKGROUND

Organizations frequently handle large quantities of data in their systems. Such data or its representations is often used internally as a basis for organizational decisions as well as externally by customers of the organizations. Accordingly, it is important for organizations to ensure the accuracy of the systems they use in handling the data.

SUMMARY

Organizations frequently handle large quantities of data in their systems. Such data or its representations is often used internally as a basis for organizational decisions as well as externally by customers of the organizations. Accordingly, it is important for organizations to ensure the accuracy of the systems they use in handling the data.

Different data storage systems often employ different data storage formats. For example, data may be stored in ASCII files, binary files, XML files, or a variety of different database formats. The stored data not only includes business data but also business logic that decides the manner in which the business data has to be handled. Furthermore, in addition to the technology stack that is built to meet the organization's functional requirements, the part of the organization's technology stack that is built to meet its non-functional requirements play a key role in impacting the handling of its business data as well. Consequently, when an organization decides to update or otherwise change its systems in order to meet its growing requirements, the organization may need to convert its data from one format to another, refactor or rewrite its business logic, or include additional solutions to its architecture. However, these processes bring with them the risk that errors may unintentionally be introduced into the systems, that will impact the existing processes. It is important to quickly identify and remediate any such errors to ensure that the organization can sustain its operations.

However, even if an organization is able to quickly identify the presence of issues, tracing the causes of these issues may not be so simple. Given the massive size of data handled by the organization to cater to various complex business cases, thousands if not millions of issues may be present. Without a way to prioritize the issues, developers may spend numerous man-hours working to fix underlying errors that are responsible for only a tiny fraction of the issues, before addressing more serious errors causing larger portions of these issues. Consequently, a large portion of the errors remain unaddressed, thereby delaying the overall remediation process. Additionally, a developer may select a given issue for remediation, only to discover, after significant time and effort, that the system error causing the issue was one that had been previously addressed.

This disclosure contemplates a defect analysis and remediation tool that addresses one or more of the above issues. This tool operates under the assumption that complexities in a system are generally not intended by design and may therefore be associated with errors in the system. Accordingly, it may be possible to locate errors in a system by modeling the system and locating complexities in the resulting model. By further ranking these complexities from least complex to most complex, it may be possible to prioritize the associated errors for remediation, under the assumption that the lower the complexity of a system error, the larger the impact the system error will have on the system outputs. Accordingly, this tool searches for the least complex model capable of producing a given set of outputs from a given set of inputs. Here, complexity is defined in terms of the number of adjustable parameters used by the model system. For example, a model containing 100 adjustable parameters is assumed to be more complex than a model that uses 50 adjustable parameters.

The tool assumes a matrix model for the system, such that $MX=Y$, where M is the model matrix, X is a vector of the system inputs and Y is a vector of the system outputs. Vectors X and Y can be observable in an unconstrained space in any dimensions related to the subject system. For example, they can be observed in any of the subject system's input/output ports or can be observed at any ports of its sub systems at any given instant of time. This gives the tool a property to be highly receptive to the information fed at any given detail and adaptive to the changes in the subject system over a period of time. The components of M are chosen from a set of basis functions which may depend on the inputs to the system and one or more adjustable parameters. The tool then searches for the least complex model for the system. Once the tool has found the least complex model, the tool groups each of the outputs based on the number of adjustable parameters contained in the matrix row associated with the output (e.g., by the model complexity). The tool then sends those outputs that correspond to errors in the system associated with the lowest model complexity to a system administrator for remediation. In this manner, the tool enables efficient remediation of errors in a system. Certain embodiments of the defect analysis and remediation tool are described below.

According to one embodiment, an apparatus includes a database and a hardware processor. The database stores a set of basis functions, a set of inputs, a set of input parameters, a set of primary outputs, and a set of secondary outputs. The set of basis functions includes a set of first functions, a set of second functions, and a set of third functions. The set of first functions includes functions of one adjustable parameter. The set of second functions includes functions of two adjustable parameters. The set of third functions includes functions of three adjustable parameters. The set of primary outputs was obtained from a first system. The set of primary outputs includes a first primary output, a second primary output, and a third primary output. The set of secondary outputs was obtained from a second system using the set of inputs and the set of input parameters. The set of secondary outputs includes a first secondary output, a second secondary output, and a third secondary output. The first secondary output is the same as the first primary output. The second secondary output is different from the second primary output. The third secondary output is different from the third primary output. The second system contains one or more errors such that if the second system did not contain the one or more errors, the first secondary output would be the same as the first primary output, the second secondary output would be the same as the second primary output, and the third secondary output would be the same as the third primary output. The processor compares the first secondary output to the first primary output and labels the first secondary output as accurate in response to determining that the first secondary output is the same as the first primary output.

The processor also compares the second secondary output to the second primary output and labels the second secondary output as inaccurate in response to determining that the second secondary output is different from the second primary output. The processor additionally compares the third secondary output to the third primary output and labels the third secondary output as inaccurate in response to determining that the third secondary output is different from the third primary output. The processor further forms a first matrix of basis functions chosen from the set of basis functions to represent the second system. Each row of the first matrix includes a first number of functions including one or more first functions of the set of first functions, one or more second functions of the set of second functions, and one or more third functions of the set of third functions. The processor further forms a first set of equations by setting the first matrix multiplied by a first vector equal to a second vector. The first vector includes the set of inputs and the set of input parameters. The second vector includes the set of secondary outputs. The processor also determines that a first solution to the first set of equations does not exist. In response to determining that the first solution to the first set of equations does not exist, the processor further forms a second matrix of basis functions chosen from the set of basis functions to represent the second system. Each row of the second matrix includes a second number of basis functions including two or more first functions of the set of first functions, two or more second functions of the set of second functions, and two or more third functions of the set of third functions. The second number of basis functions is twice as large as the first number of basis functions. The processor additionally forms a second set of equations by setting the second matrix multiplied by a third vector equal to the second vector. The third vector includes the set of inputs, a first copy of the set of inputs, the set of input parameters, and a second copy of the set of input parameters. The processor also determines that a second solution to the second set of equations does exist. In response to determining that the second solution to the second set of equations does exist, the processor further removes at least one basis function from a first row of the second matrix. The at least one basis function includes either a first second function of the set of second functions or a first third function of the set of third functions. The processor further forms a third set of equations by setting the second matrix multiplied by the third vector equal to the second vector. Here, setting the first row of the second matrix multiplied by the third vector equal to the second secondary output defines a first equation of the third set of equations. The processor additionally determines that a third solution to the third set of equations does exist. The processor also removes at least one basis function from a second row of the second matrix. The second row is different from the first row. The at least one basis function includes either a second second function of the set of second functions or a second third function of the set of third functions. The processor further forms a fourth set of equations by setting the second matrix multiplied by the third vector equal to the second vector. Here, setting the second row of the second matrix multiplied by the third vector equal to the third secondary output defines a second equation of the fourth set of equations. The processor additionally determines that a fourth solution to the fourth set of equations does not exist. In response to determining that the third solution does exist and that the fourth solution does not exist, the processor sends the second secondary output as a remediation candidate to an administrator.

According to another embodiment, a method includes comparing a first secondary output of a set of secondary outputs to a first primary output of a set of primary outputs. The set of primary outputs is obtained from a first system. The set of secondary outputs is obtained from a second system using the set of inputs and the set of input parameters. The set of primary outputs includes the first primary output, a second primary output, and a third primary output. The set of secondary outputs includes the first secondary output, a second secondary output, and a third secondary output. The first secondary output is the same as the first primary output. The second secondary output is different from the second primary output. The third secondary output is different from the third primary output. The second system contains one or more errors such that if the second system did not contain the one or more errors, the first secondary output would be the same as the first primary output, the second secondary output would be the same as the second primary output, and the third secondary output would be the same as the third primary output. The method additionally includes labeling the first secondary output as accurate in response to determining that the first secondary output is the same as the first primary output. The method also includes comparing the second secondary output of the set of secondary outputs to the second primary output of the set of primary outputs and labeling the second secondary output as inaccurate in response to determining that the second secondary output is different from the second primary output. The method further includes comparing the third secondary output of the set of secondary outputs to the third primary output of the set of primary outputs and labeling the third secondary output as inaccurate in response to determining that the third secondary output is different from the third primary output. The method additionally includes forming a first matrix of basis functions chosen from a set of basis functions to represent the second system. Each row of the first matrix includes a first number of functions including one or more first functions of a set of first functions, one or more second functions of a set of second functions, and one or more third functions of a set of third functions. The set of first functions includes functions of one adjustable parameter, the set of second functions includes functions of two adjustable parameters, and the set of third functions includes functions of three adjustable parameters. The method also includes forming a first set of equations by setting the first matrix multiplied by a first vector equal to a second vector. The first vector includes the set of inputs and the set of input parameters. The second vector includes the set of secondary outputs. The method further includes determining that a first solution to the first set of equations does not exist. In response to determining that the first solution to the first set of equations does not exist, the method includes forming a second matrix of basis functions chosen from the set of basis functions to represent the second system. Each row of the second matrix includes a second number of basis functions including two or more first functions of the set of first functions, two or more second functions of the set of second functions, and two or more third functions of the set of third functions. The second number twice as large as the first number. The method further includes forming a second set of equations by setting the second matrix multiplied by a third vector equal to the second vector. The third vector includes the set of inputs, a first copy of the set of inputs, the set of input parameters, and a second copy of the set of input parameters. The method also includes determining that a second solution to the second set of equations does exist. In response to determining that the second solution to the second set of equations does exist, the method includes removing at least one basis function from a first row of the second matrix. The at least one basis function includes either a first second function of the set of second functions or a first third function of the set of third functions. The method further includes forming a third set of equations by setting the second matrix multiplied by the third vector equal to the second vector. Here, setting the first row of the second matrix multiplied by the third vector equal to the second secondary output defines a first equation of the third set of equations. The method additionally includes determining that a third solution to the third set of equations does exist. The method also includes removing at least one basis function from a second row of the second matrix. The second row is different from the first row. The at least one basis function includes either a second second function of the set of second functions or a second third function of the set of third functions. The method further includes forming a fourth set of equations by setting the second matrix multiplied by the third vector equal to the second vector. Here, setting the second row of the second matrix multiplied by the third vector equal to the third secondary output defines a second equation of the fourth set of equations. The method additionally includes determining that a fourth solution to the fourth set of equations does not exist. In response to determining that the third solution does exist and that the fourth solution does not exist, the method includes sending the second secondary output as a remediation candidate to an administrator.

According to a further embodiment, a system includes a storage element and a processing element. The storage element is operable to store a set of basis functions, a set of inputs, a set of input parameters, a set of primary outputs, and a set of secondary outputs. The set of basis functions includes a set of first functions, a set of second functions, and a set of third functions. The set of first functions includes functions of one adjustable parameter. The set of second functions includes functions of two adjustable parameters. The set of third functions includes functions of three adjustable parameters. The set of primary outputs was obtained from a first system. The set of primary outputs includes a first primary output, a second primary output, and a third primary output. The set of secondary outputs was obtained from a second system using the set of inputs and the set of input parameters. The set of secondary outputs includes a first secondary output, a second secondary output, and a third secondary output. The first secondary output is the same as the first primary output. The second secondary output is different from the second primary output. The third secondary output is different from the third primary output. The second system contains one or more errors such that if the second system did not contain the one or more errors, the first secondary output would be the same as the first primary output, the second secondary output would be the same as the second primary output, and the third secondary output would be the same as the third primary output. The processing element is operable to compare the first secondary output to the first primary output and label the first secondary output as accurate in response to determining that the first secondary output is the same as the first primary output. The processing element is also operable to compare the second secondary output to the second primary output and label the second secondary output as inaccurate in response to determining that the second secondary output is different from the second primary output. The processing element is additionally operable to compare the third secondary output to the third primary output and label the third secondary output as inaccurate in response to determining that the third secondary output is different from the third primary output. The processing element is further operable to form a first matrix of basis functions chosen from the set of basis functions to represent the second system. Each row of the first matrix includes a first number of functions including one or more first functions of the set of first functions, one or more second functions of the set of second functions, and one or more third functions of the set of third functions. The processing element is further operable to form a first set of equations by setting the first matrix multiplied by a first vector equal to a second vector. The first vector includes the set of inputs and the set of input parameters. The second vector includes the set of secondary outputs. The processing element is also operable to determine that a first solution to the first set of equations does not exist. In response to determining that the first solution to the first set of equations does not exist, the processing element is further operable to form a second matrix of basis functions chosen from the set of basis functions to represent the second system. Each row of the second matrix includes a second number of basis functions including two or more first functions of the set of first functions, two or more second functions of the set of second functions, and two or more third functions of the set of third functions. The second number of basis functions is twice as large as the first number of basis functions. The processing element is additionally operable to form a second set of equations by setting the second matrix multiplied by a third vector equal to the second vector. The third vector includes the set of inputs, a first copy of the set of inputs, the set of input parameters, and a second copy of the set of input parameters. The processing element is also operable to determine that a second solution to the second set of equations does exist. In response to determining that the second solution to the second set of equations does exist, the processing element is further operable to remove at least one basis function from a first row of the second matrix. The at least one basis function includes either a first second function of the set of second functions or a first third function of the set of third functions. The processing element is further operable to form a third set of equations by setting the second matrix multiplied by the third vector equal to the second vector. Here, setting the first row of the second matrix multiplied by the third vector equal to the second secondary output defines a first equation of the third set of equations. The processing element is additionally operable to determine that a third solution to the third set of equations does exist. The processing element is also operable to remove at least one basis function from a second row of the second matrix. The second row is different from the first row. The at least one basis function includes either a second second function of the set of second functions or a second third function of the set of third functions. The processing element is further operable to form a fourth set of equations by setting the second matrix multiplied by the third vector equal to the second vector. Here, setting the second row of the second matrix multiplied by the third vector equal to the third secondary output defines a second equation of the fourth set of equations. The processing element is additionally operable to determine that a fourth solution to the fourth set of equations does not exist. In response to determining that the third solution does exist and that the fourth solution does not exist, the processing element is operable to send the second secondary output as a remediation candidate to an administrator.

Certain embodiments provide one or more technical advantages. For example, an embodiment prioritizes errors in a system based on the extent to which they affect the output data of the system, thus enabling an efficient data remediation process. As another example, an embodiment increases the likelihood that output data chosen for remediation is non-redundant. As a further example, an embodiment helps ensure that output data accessed by users is accurate. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 3 presents a flowchart illustrating the process by which the defect analysis and remediation tool in the system of FIG. 1 prioritizes output data for remediation;

DETAILED DESCRIPTION

Figure 1:
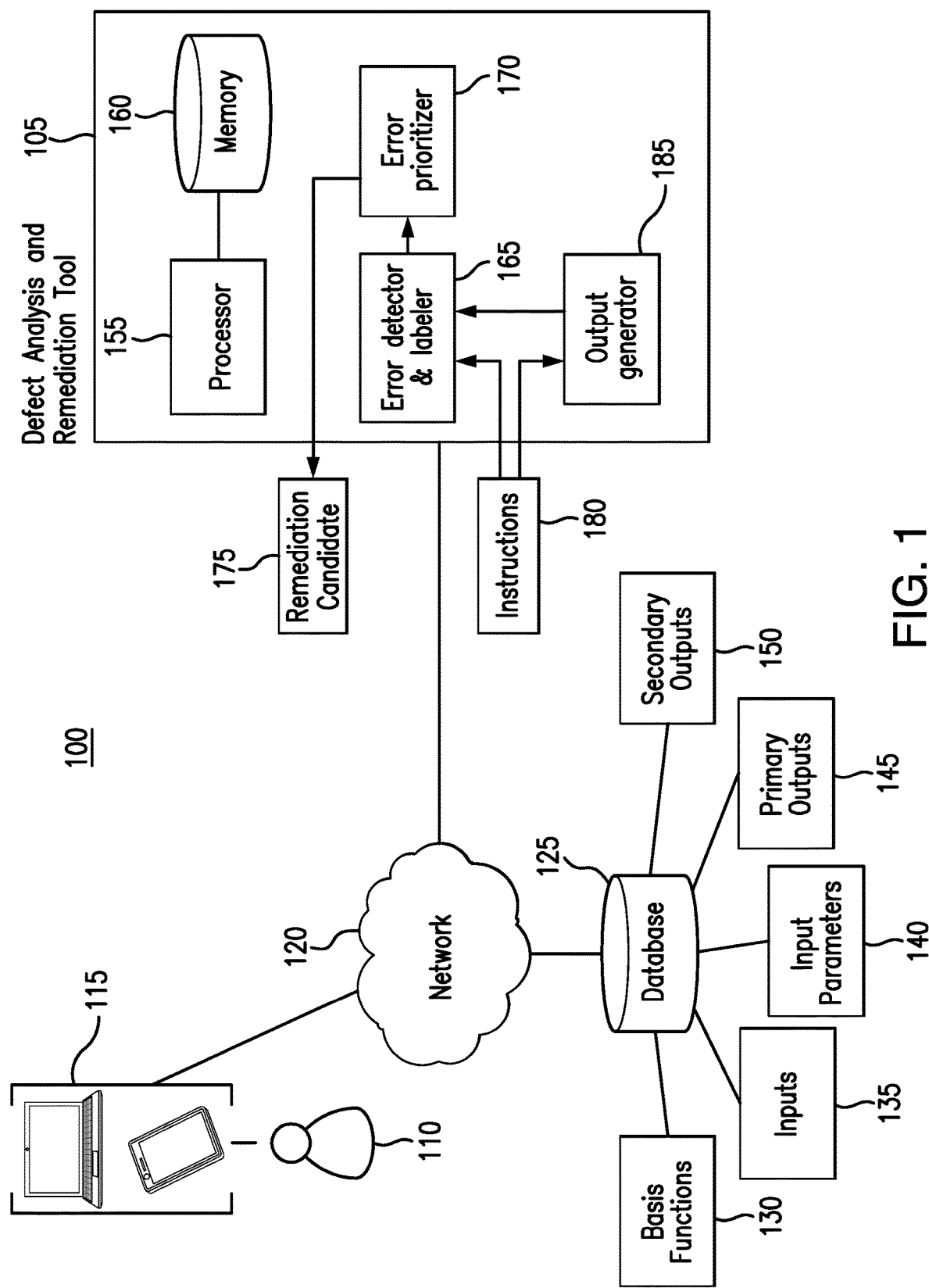
FIG. 1 illustrates an example system.

Embodiments of the present disclosure and its advantages are best understood by referring to FIGS. 1 through 4 of the drawings, like numerals being used for like and corresponding parts of the various drawings.

Organizations frequently handle large quantities of data in their systems. Such data or its representations is often used internally as a basis for organizational decisions as well as externally by customers of the organizations. Accordingly, it is important for organizations to ensure the accuracy of the systems they use in handling the data.

Different data storage systems often employ different data storage formats. For example, data may be stored in ASCII files, binary files, XML files, or a variety of different database formats. The stored data not only includes business data but also business logic that decides the manner in which the business data has to be handled. Furthermore, in addition to the technology stack that is built to meet the organization's functional requirements, the part of the organization's technology stack that is built to meet its non-functional requirements play a key role in impacting the handling of its business data as well. Consequently, when an organization decides to update or otherwise change its systems in order to meet its growing requirements, the organization may need to convert its data from one format to another, refactor or rewrite its business logic, or include additional solutions to its architecture. However, these processes bring with them the risk that errors may unintentionally be introduced into the systems, that will impact the existing processes. It is important to quickly identify and remediate any such errors to ensure that the organization can sustain its operations.

However, even if an organization is able to quickly identify the presence of issues, tracing the causes of these issues may not be so simple. Given the massive size of data handled by the organization to cater to various complex business cases, thousands if not millions of issues may be present. Without a way to prioritize the issues, developers may spend numerous man-hours working to fix underlying errors that are responsible for only a tiny fraction of the issues, before addressing more serious errors causing larger portions of these issues. Consequently, a large portion of the errors remain unaddressed, thereby delaying the overall remediation process. Additionally, a developer may select a given issue for remediation, only to discover, after significant time and effort, that the system error causing the issue was one that had been previously addressed.

This disclosure contemplates a defect analysis and remediation tool that addresses one or more of the above issues. This tool operates under the assumption that complexities in a system are generally not intended by design and may therefore be associated with errors in the system. Accordingly, it may be possible to locate errors in a system by modeling the system and locating complexities in the resulting model. By further ranking these complexities from least complex to most complex, it may be possible to prioritize the associated errors for remediation, under the assumption that the lower the complexity of a system error, the larger the impact the system error will have on the system outputs. Accordingly, this tool searches for the least complex model capable of producing a given set of outputs from a given set of inputs. Here, complexity is defined in terms of the number of adjustable parameters used by the model system. For example, a model containing 100 adjustable parameters is assumed to be more complex than a model that uses 50 adjustable parameters.

The tool assumes a matrix model for the system, such that $MX=Y$, where $M$ is the model matrix, $X$ is a vector of the system inputs and $Y$ is a vector of the system outputs. Vectors $X$ and $Y$ can be observable in an unconstrained space in any dimensions related to the subject system. For example, they can be observed in any of the subject system's input/output ports or can be observed at any ports of its sub systems at any given instant of time. This gives the tool a property to be highly receptive to the information fed at any given detail and adaptive to the changes in the subject system over a period of time. The components of $M$ are chosen from a set of basis functions which may depend on the inputs to the system and one or more adjustable parameters. The tool then searches for the least complex model for the system. Once the tool has found the least complex model, the tool groups each of the outputs based on the number of adjustable parameters contained in the matrix row associated with the output (e.g., by the model complexity). The tool then sends those outputs that correspond to errors in the system associated with the lowest model complexity to a system administrator for remediation. In this manner, the tool enables efficient remediation of errors in a system. The defect analysis and remediation tool will be described in more detail using FIGS. 1 through 4.

FIG. 1 illustrates an example system 100. As seen in FIG. 1, system 100 includes defect analysis and remediation tool 105, one or more devices 115, network 120, and database 125. Generally, defect analysis and remediation tool 105 operates on a set of secondary outputs that have been generated by a second system that may contain errors and that is the subject of validation efforts. The tool first compares each output of the set of secondary outputs to a corresponding primary output from a set of primary outputs, where the set of primary outputs have been generated by a first system that has previously undergone validation and for which the primary outputs are expected to match the secondary outputs generated by the second system, provided there are no errors present in the second system. The tool labels those secondary outputs that are the same as their corresponding primary outputs as accurate, and those secondary outputs that are different from their corresponding primary outputs as inaccurate. The tool then generates an optimal model for the second system by proposing a matrix model, MX=B, where M is a model matrix composed of a set of basis functions, X is a vector composed of the inputs and the input parameters, and B is a vector composed of the secondary outputs. The tool then iteratively decreases the number of adjustable parameters in the model matrix until a solution to the matrix equation will no longer exist for any further reduction. The tool then ranks each inaccurate secondary output according to the number of adjustable parameters contained in its corresponding model matrix row, from least to most. Those secondary outputs labeled as inaccurate and corresponding to rows of the model matrix with the fewest adjustable parameters are assumed to be associated with errors in the second system that are the least complex. The tool therefore sends one or more of the highest ranked secondary outputs to a system administrator as potential remediation candidates, since these outputs are likely to be associated with errors in the second system having the greatest impact on the system's output. In this manner, certain embodiments of the tool enable an efficient data remediation process.

Devices 115 are used by users 110 to receive remediation candidates 175 from defect analysis and remediation tool 105 and to send instructions 180 back to defect analysis and remediation tool 105. In certain embodiments, devices 115 may communicate with defect analysis and remediation tool 105 through network 115 via a web interface.

Devices 115 include any appropriate device for communicating with components of system 100 over network 120. For example, devices 115 may be a telephone, a mobile phone, a computer, a laptop, a tablet, a server, and/or an automated assistant. This disclosure contemplates device 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 stores a set of primary outputs 145, a set of secondary outputs 150, a set of inputs 135, a set of input parameters 140, and a set of basis functions 130. Primary outputs 145 have been generated by a first system that has previously undergone validation and/or for which the outputs are trusted. Secondary outputs 150 have been generated by a second system at a later time than the primary outputs or at a time simultaneous to the primary outputs, using the set of inputs 135 and the set of input parameters 140. This disclosure contemplates that the primary outputs are generated by the first system using either the same set of inputs 135 and the same set of input parameters 140 as used by the second system, or a similar set of inputs to the set of inputs 135 and a similar set of input parameters to the set of input parameters 140 as used by the second system, such that secondary outputs 150 are expected to be the same as the primary outputs 145 but for the presence of errors in the second system. This disclosure contemplates that a secondary output of the set of secondary outputs 150 is the same as a primary output of the set of primary outputs 145 if the secondary output and the primary output represent the same underlying piece of data, regardless of the data storage format used to store the data.

Basis functions from the set of basis functions 130 are used by defect analysis and remediation tool 105 to generate a model for the second system, such that given the set of inputs 135 and the set of input parameters 140, the model is able to generate the set of secondary outputs 150. This disclosure contemplates that the set of basis functions 130 can be any set of functions for which a linear combination of a sufficient number of the functions can be used to model any set of data. For example, in certain embodiments, the set of basis functions 130 contains a set of Gaussian functions. In certain other embodiments, the set of basis functions 130 contains a set of Fourier basis functions.

As seen in FIG. 1, defect analysis and remediation tool 105 includes a processor 155 and a memory 160. This disclosure contemplates processor 155 and memory 160 being configured to perform any of the functions of defect analysis and remediation tool 105 described herein. Generally, defect analysis and remediation tool 105 implements error detector and labeler 165, error prioritizer 170, and output generator 185.

Error detector and labeler 165 compares each secondary output of the set of secondary outputs 150 to its corresponding primary output from the set of primary outputs 145. If no errors are present in either the second system used to generate the set of secondary outputs 150 or the first system used to generate the set of primary outputs 140, the set of secondary outputs 150 is expected to be the same as the set of primary outputs 145. As explained above, the set of primary outputs 145 have been generated by a first system that has undergone validation and/or for which the primary outputs 145 are trusted. Accordingly, by identifying those secondary outputs of the set of secondary outputs 150 that do not match their associated primary outputs, the tool is able to identify remediation candidates from the set of secondary outputs 150 that can be used to investigate the causes of error in the second system. Error detector and labeler 165 therefore labels those secondary outputs from the set of secondary outputs 150 that are different from their associated primary output from the set of primary outputs 145 as inaccurate and those that are the same as their associated primary output as accurate.

In certain embodiments, error detector and labeler 165 additionally receives instructions 180 from a user 110 to relabel a given secondary output that was previously labeled inaccurate, as accurate. For example, user 110 may have determined that the discrepancy between the secondary output and its associated primary output is due to a previously undetected error in the first system, or a new feature, intentionally added to the second system. In response to receiving such an instruction 180 from user 110, error detector and labeler 165 relabels the secondary output as accurate.

Error detector and labeler 165 may be a software module stored in memory 160 and executed by processor 155. An example algorithm for error detector and labeler 165 is as follows: access database 125; for each secondary output of the set of secondary outputs 150: {compare the secondary output to its corresponding primary output of the set of primary outputs 145; if the secondary output is the same as the primary output, label the secondary output as accurate; if the secondary output is different from the primary output, label the secondary output as inaccurate}; receive instructions from a user 110 to relabel a secondary output of the set of secondary outputs 150 as accurate; relabel the secondary output as accurate.

Error prioritizer 170 determines those secondary outputs, labeled by error detector and labeler 165 as inaccurate, for which the associated errors in the second system are likely to have a large impact on other output generated by the system. Error prioritizer 170 accomplishes this by operating under the assumption that the lower the system complexity associated with an error, the larger the impact the error will have on other system outputs. Therefore, by ranking the system complexity associated with an error from least complex to most complex, error prioritizer 170 is able to prioritize inaccurate secondary outputs (and their associated system errors) for remediation.

Error prioritizer 170 assumes a matrix model for the second system, such that $MX=Y$, where M is the model matrix, X is a vector of the system inputs 135 and input parameters 140, and Y is a vector of the secondary outputs 150. The components of M are chosen from the set of basis functions 130, which may depend on the inputs 135 and input parameters 140 as well as one or more adjustable parameters. Error prioritizer 170 then searches for the least complex model matrix M for which a solution to the matrix equation exists. Error prioritizer 170 assumes a direct relation between system complexity and the number of independent adjustable parameters in the model matrix. In certain embodiments, error prioritizer 170 searches for the least complex model matrix M by iteratively reducing the number of basis functions in model matrix M until it is no longer possible to remove an additional basis function and still determine that a solution to the matrix equation exists. In certain other embodiments, error prioritizer 170 searches for the least complex model matrix M by iteratively reducing the number of independent adjustable parameters in model matrix M until it is no longer possible to reduce the number of independent adjustable parameters further and still determine that a solution to the matrix equation exists.

Once error prioritizer 170 has found the least complex model, error prioritizer 170 groups each of the secondary outputs of the set of secondary outputs 150 that have been labeled as inaccurate by error detector and labeler 165, based on the number of independent adjustable parameters contained in the matrix row associated with the given secondary output (e.g., by the model complexity). In certain other embodiments, error prioritizer 170 groups each of the secondary outputs of the set of secondary outputs 150 that have been labeled as inaccurate by error detector and labeler 165, based on both the number of independent adjustable parameters contained in the matrix row associated with the given secondary output and the variance of the independent adjustable parameters contained in the matrix row associated with the given secondary output, compared with the other adjustable parameters in the system, assuming that the differences between pairs of independent adjustable parameters in the model matrix follow a normal distribution. The tool then sends those outputs that correspond to errors in the system associated with the lowest model complexity as remediation candidates 175, to a system administrator 110 for consideration.

In certain embodiments, after error prioritizer 170 has determined the least complex model, error prioritizer may receive additional labeled secondary output data 150 from error detector and labeler 165. For example, error prioritizer 170 may receive additional labeled secondary output data 150 from error detector and labeler 165 in situations where defect analysis and remediation tool 105 is operating on secondary outputs 150 while the second system is continuing to generate secondary outputs 150. In certain such embodiments, error prioritizer may determine that the least complex model does not fit the new secondary output data (i.e. a solution no longer exists to the matrix equation). In such embodiments, defect analysis and remediation tool 105 may increase the number of basis functions in the model matrix and search for a new least complex model using the same process as described above.

Error prioritizer 170 may be a software module stored in memory 160 and executed by processor 155. An example algorithm for error prioritizer 170 is provided below in the discussion of FIG. 2B.

In certain embodiments, output generator 185 is used to generate new values for secondary outputs 150 in response to defect analysis and remediation tool 105 receiving instructions 180 from user 110 indicating that one or more errors have been removed from the second system and that secondary outputs 150 should be replaced by new secondary outputs generated by the updated second system. Output generator 185 causes the second system to generate new secondary outputs based on inputs 135 and input parameters 140. Output generator 185 then stores the new secondary outputs as secondary outputs 150 in database 125 and instructs error detector and labeler 165 to label the new secondary outputs 150 as either accurate or inaccurate.

Output generator 185 may be a software module stored in memory 160 and executed by processor 155. An example algorithm for output generator 185 is as follows: receive instructions 180 from user 110 indicating that remediation has occurred and that new secondary outputs should be generated; cause the second system to generate new secondary outputs using inputs 135 and input parameters 140; store the new secondary outputs as secondary outputs 150 in database 125; instruct error detector and labeler 165 to relabel the secondary outputs 150.

Processor 155 is any electronic circuitry, including, but not limited to microprocessors, application specific integrated circuits (ASIC), application specific instruction set processor (ASIP), and/or state machines, that communicatively couples to memory 160 and controls the operation of defect analysis and remediation tool 105. Processor 155 may be 8-bit, 16-bit, 32-bit, 64-bit or of any other suitable architecture. Processor 155 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 155 may include other hardware and software that operates to control and process information. Processor 155 executes software stored on memory to perform any of the functions described herein. Processor 155 controls the operation and administration of defect analysis and remediation tool 105 by processing information received from network 120, device(s) 115, and memory 160. Processor 155 may be a programmable logic device, a microcontroller, a microprocessor, any suitable processing device, or any suitable combination of the preceding. Processor 155 is not limited to a single processing device and may encompass multiple processing devices.

Memory 160 may store, either permanently or temporarily, data, operational software, or other information for processor 155. Memory 160 may include any one or a combination of volatile or non-volatile local or remote devices suitable for storing information. For example, memory 160 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 160, a disk, a CD, or a flash drive. In particular embodiments, the software may include an application executable by processor 155 to perform one or more of the functions described herein.

In certain embodiments, system 100 enables an efficient data remediation process. By modeling a second system that was used to produce a set of secondary outputs (some of which are inaccurate), attempting to minimize the number of adjustable parameters used by the model (and therefore minimize the model complexity), and prioritizing those secondary outputs associated with the least complex segments of the matrix model, in certain embodiments, defect analysis and remediation tool 105 prioritizes for remediation those errors in the second system that are most likely to have the greatest impact on the system output.

Figure 2A:
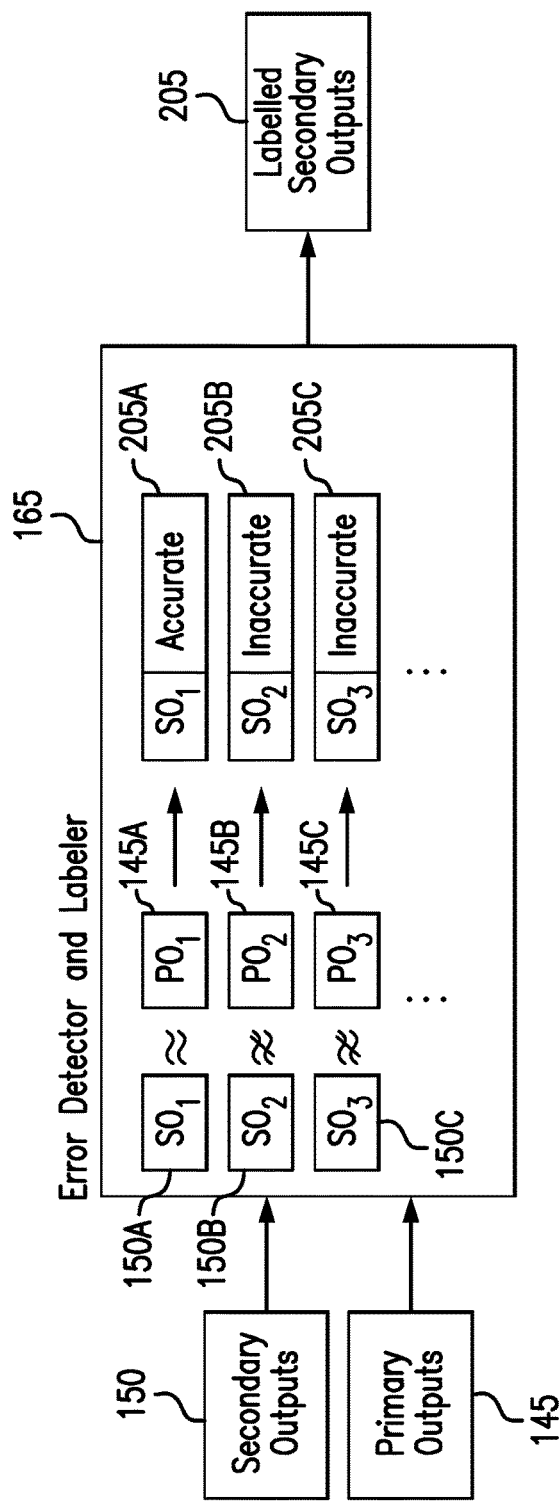
FIGS. 2A and 2B illustrate the error detection and error prioritization components of the defect analysis and remediation tool in the system of FIG. 1.
Figure 2B:
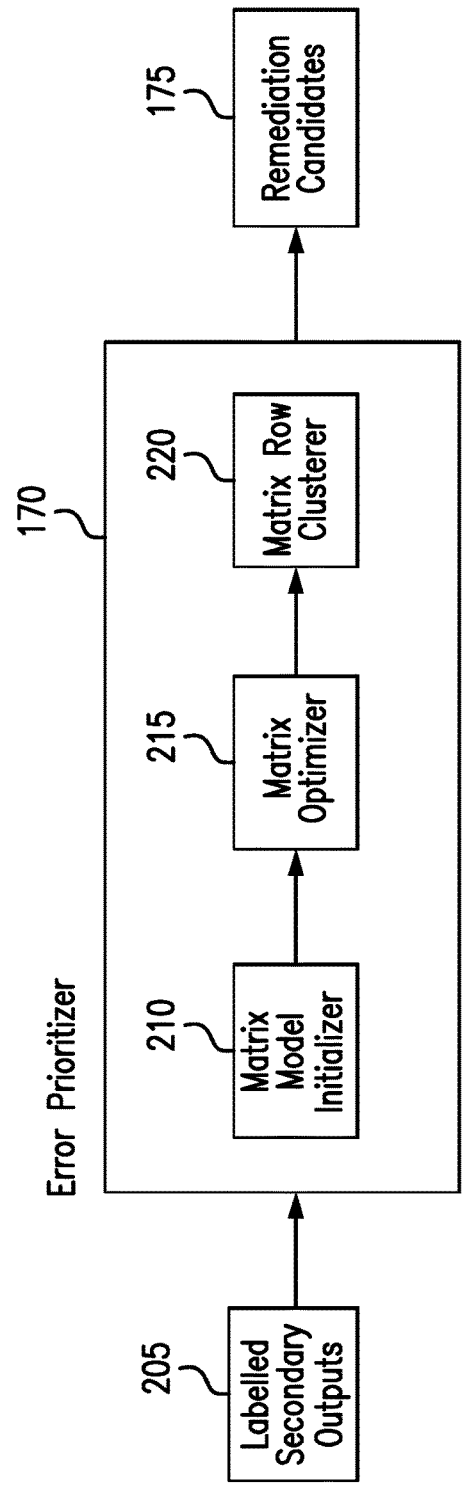

FIGS. 2A and 2B illustrate error detector and labeler 165 and error prioritizer 170 of defect analysis and remediation tool 105 in greater detail.

As can be seen in FIG. 2A, error detector and labeler 165 operates on secondary outputs 150 and primary outputs 145 stored in database 125. For each secondary output of the set of secondary outputs 150, error detector and labeler 165 compares its value to the value of its associated primary output from the set of primary outputs 145. For example, error detector and labeler 165 compares first secondary output 150A to first primary output 145A. In response to determining that first secondary output 150A and first primary output 145A are the same, error detector and labeler 165 labels first secondary output 150A as accurate, illustrated here as labeled first secondary output 205A. Error detector and labeler 165 also compares second secondary output 150B to second primary output 145B. In response to determining that second secondary output 150B is different from second primary output 145B, error detector and labeler 165 labels second secondary output 150B as inaccurate, illustrated here as labeled second secondary output 205B. Additionally, error detector and labeler 165 compares third secondary output 150C to third primary output 145C. In response to determining that third secondary output 150C is different from third primary output 145C, error detector and labeler 165 labels third secondary output 150C as inaccurate, illustrated here as labeled third secondary output 205C. Error detector and labeler 165 then passes the labeled secondary outputs 205 to error prioritizer 170.

As can be seen in FIG. 2B, error prioritizer 170 operates on labeled secondary outputs 205 received from error detector and labeler 165. Error prioritizer 170 first attempts to determine a model to represent the second system that was used to generate secondary outputs 150, using matrix model initializer 210. For example, in certain embodiments, matrix model initializer 210 first assumes a matrix model of the following form:

$$\underbrace{\begin{bmatrix} m_{11} & m_{12} & m_{13} & \cdots & m_{1n} \\ m_{21} & m_{22} & m_{23} & \cdots & m_{2n} \\ \vdots & \vdots & \vdots & \vdots & \vdots \\ \vdots & \vdots & \vdots & \vdots & \vdots \\ \vdots & \vdots & \vdots & \vdots & \vdots \\ m_{n1} & m_{n2} & m_{n3} & \cdots & m_{nn} \end{bmatrix}_{n \times n}}_{M} \underbrace{\begin{bmatrix} x_1 \\ x_2 \\ \vdots \\ x_p \\ 0 \\ \vdots \\ 0 \end{bmatrix}_{n \times 1}}_{X} = \underbrace{\begin{bmatrix} y_1 \\ y_2 \\ \vdots \\ y_q \\ 0 \\ \vdots \\ 0 \end{bmatrix}_{n \times 1}}_{Y}, \quad (1)$$

where $0<\{p,q\}\leq n$, $n>0$, each $m_{ij}$ is a basis function chosen from a set of basis functions 130, each $x_i$ is an input or an input parameter, such that X is a vector that contains the set of inputs 135 and the set of input parameters 140, and each $y_i$ is a secondary output, such that Y is a vector that contains the set of secondary outputs 150. In certain embodiments, the length of vector X is longer than necessary to accommodate the set of inputs 135 and the set of input parameters 140, and the length of vector Y is longer than necessary to accommodate the set of secondary outputs 150. This enables defect analysis and remediation tool 105 to use additional secondary outputs to model the second system as they are generated by the second system.

This disclosure contemplates that the set of basis functions 130 can be any set of functions for which a linear combination of a sufficient number of the functions can be used to model any set of data. For example, in certain embodiments, the set of basis functions 130 contains a set of Gaussian functions. In certain other embodiments, the set of basis functions 130 contains a set of Fourier basis functions. Here, for ease of explanation, a set of Gaussian basis functions 130 are assumed. These Gaussian basis functions take the form:

$$m_{ij} = \sum_{k=1}^{K} \Phi_{ijk} e^{\sigma_{ijk}(x_i - \mu_{ijk})^2} \quad (2)$$

where $0\leq(i,j)\leq n$, $\phi_{ijk}\geq 0$, $0\leq\sigma_{ijk}\leq 1-\infty<\mu_{ijk}<\infty$.

Using these Gaussian basis functions, equation (1) can be expanded to yield:

$$\begin{bmatrix} m_{111} & m_{112} & \cdots & m_{11K} & \cdots & m_{1n1} & m_{1n2} & \cdots & m_{1nK} \\ m_{211} & m_{212} & \cdots & m_{21K} & \cdots & m_{2n1} & m_{2n2} & \cdots & m_{2nK} \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ m_{n11} & m_{n12} & \cdots & m_{n1K} & \cdots & m_{nn1} & m_{nn2} & \cdots & m_{nnK} \end{bmatrix}_{m \times n} \begin{bmatrix} x_1 \\ \vdots \\ x_1 \\ x_2 \\ \vdots \\ x_2 \\ \vdots \\ x_p \\ \vdots \\ x_p \\ 0 \\ \vdots \\ 0 \end{bmatrix}_{m \times 1} = \quad (3)$$

$$\begin{bmatrix} y_1 \\ y_2 \\ \vdots \\ y_q \\ 0 \\ \vdots \\ 0 \end{bmatrix}_{n \times 1},$$

where $m_{ijk} = \phi_{ijk} e^{\sigma_{ijk}(x_i - \mu_{ijk})^2}$. Matrix model initializer 210 starts by setting a value for K equal to 1. It then determines whether a solution to equation (3) exists (i.e., whether finite values for each $\phi_{ik1}$, $\sigma_{ij1}$, and $\mu_{ij1}$ exist that satisfy equation (3)). If matrix model initializer 210 determines that a solution to equation (3) does not exist, matrix model initializer 210 increases the value for K until it determines that a solution to equation (3) does exist. By increasing the value of K from 1 to 2, matrix model initializer 210 doubles the number of basis functions contained in matrix M.

Given Gaussian basis functions, each component of matrix M in equation (3) is a function of three adjustable parameters, such that:

$$\begin{bmatrix} f(\phi_{111}, \sigma_{111}, \mu_{111}) & \cdots & f(\phi_{1nK}, \sigma_{1nK}, \mu_{1nK}) & \cdots \\ f(\phi_{211}, \sigma_{211}, \mu_{211}) & \cdots & f(\phi_{2nK}, \sigma_{2nK}, \mu_{2nK}) & \cdots \\ \vdots & & \vdots & \\ \vdots & & \vdots & \\ \vdots & & \vdots & \\ f(\phi_{n11}, \sigma_{n11}, \mu_{n11}) & \cdots & f(\phi_{nnK}, \sigma_{nnK}, \mu_{nnK}) & \cdots \end{bmatrix}_{m \times n}, \quad (4)$$

where each adjustable parameter illustrated in equation (4) belongs to the set P of adjustable parameters, given by $P = [\phi_{111}, \ldots, \sigma_{111}, \ldots, \mu_{111}, \ldots]$.

Once matrix model initializer 210 determines a matrix M such that a solution to equation (3) exists, matrix optimizer 215 then searches for the least complex model matrix M for which a solution to the matrix equation still exists. Matrix optimizer 215 assumes a direct relation between system complexity and the number of independent adjustable parameters in the model matrix. In certain embodiments, matrix optimizer 215 searches for the least complex model matrix M by iteratively reducing the number of basis functions in model matrix M until it is no longer possible to remove an additional basis function and still determine that a solution to the matrix equation exists. In certain other embodiments, matrix optimizer 215 searches for the least complex model matrix M by iteratively reducing the number of independent adjustable parameters in model matrix M until it is no longer possible to reduce the number of independent adjustable parameters further and still determine that a solution to the matrix equation exists. In certain other embodiments, matrix optimizer 215 searches for the least complex model matrix M using the algorithm described below.

For simplicity, the example algorithm assumes that $Q \subset \{P | \phi_{ijk} \neq \alpha_{ijk} \neq \mu_{ijk} \neq \phi_{i*j*k*} \neq \alpha_{i*j*k*} \neq \mu_{i*j*k*}\}$ and $Q' \subset \{P | \phi_{ijk} = \alpha_{ijk} = \mu_{ijk} = \phi_{i*j*k*} = \alpha_{i*j*k*} = \mu_{i*j*k*} = \zeta\}$ for any i, j, k, i*, j*, and k*. Using these definitions, if $(\phi_{ijk}, \alpha_{ijk}, \mu_{ijk}) \in Q$, then the matrix element $m_{ijk}$ is given by the equation $m_{ijk} = \phi_{ijk} e^{\sigma_{ijk}(x_i - \mu_{ijk})^2}$. If $(\alpha_{ijk}, \mu_{ijk}) \in Q$ and $(\phi_{ijk}) \notin Q$, then $m_{ijk} = \zeta e^{\sigma_{ijk}(x_i - \mu_{ijk})^2}$. Finally, if $(\phi_{ijk}, \alpha_{ijk}, \mu_{ijk}) \notin Q$, then $m_{ijk} = \zeta e^{\zeta(x - \zeta)^2}$. Given the above definitions, the matrix of equation (3) can be rewritten in the form $A_{m \times n} X_{n \times 1} = B_{m \times 1}$, where:

$$X = \begin{bmatrix} K \\ \zeta \\ 1 \end{bmatrix} \quad (5)$$

$$A = \begin{bmatrix} \sum x_i \zeta e^{\zeta(x_i - \zeta)^2} & \sum_{k=1}^{K} \sum x_i e^{\alpha_{i1k}(x_i - \mu_{i1k})^2} & \sum_{k=1}^{K} \sum x_i \phi_{i1k} e^{\alpha_{i1k}(x_i - \mu_{i1k})^2} \\ \sum x_i \zeta e^{\zeta(x_i - \zeta)^2} & \sum_{k=1}^{K} \sum x_i e^{\alpha_{i2k}(x_i - \mu_{i2k})^2} & \sum_{k=1}^{K} \sum x_i \phi_{i2k} e^{\alpha_{i1k}(x_i - \mu_{i2k})^2} \\ \vdots & \vdots & \vdots \\ \vdots & \vdots & \vdots \\ \sum x_i \zeta e^{\zeta(x_i - \zeta)^2} & \sum_{k=1}^{K} \sum x_i e^{\alpha_{ink}(x_i - \mu_{ink})^2} & \sum_{k=1}^{K} \sum x_i \phi_{ink} e^{\alpha_{ink}(x_i - \mu_{ink})^2} \end{bmatrix} \quad (6)$$

$$B = \begin{bmatrix} y_1 \\ y_2 \\ \vdots \\ \vdots \\ \vdots \\ y_n \end{bmatrix} \quad (7)$$

As can be seen from equation (6), each row of matrix A contains three groups of basis functions—a first group that contains one independent adjustable parameter, $\zeta$, a second group that contains two additional independent adjustable parameters, $\alpha_{ijk}$ and $\mu_{ijk}$ and a third group that contains three independent adjustable parameters, $\phi_{ijk}$, $\alpha_{ijk}$, and $\mu_{ijk}$. Representing these three components as $a_j = \sum_{k=1}^{K}\sum_{i=1}^{n} x_i e^{\alpha_{ijk}(x_i - \mu_{ijk})^2}$, $b_j = \sum_{k=1}^{K}\sum_{i=1}^{n} x_i \phi_{ijk} e^{\alpha_{ijk}(x_i - \mu_{ijk})^2}$, and $c_j = \sum_{i=1}^{n} x_i \zeta e^{\zeta(x_i - \zeta)^2}$, matrix A can be rewritten as a matrix of three columns:

$$A = \begin{bmatrix} c_1 & a_1 & b_1 \\ c_2 & a_2 & b_2 \\ \vdots & \vdots & \vdots \\ \vdots & \vdots & \vdots \\ \vdots & \vdots & \vdots \\ c_3 & a_n & b_n \end{bmatrix} \qquad (8)$$

In certain embodiments, matrix optimizer 215 determines the least complex matrix model A by splitting matrix A into a set of 3×3 submatrices, and attempting to eliminate the components $a_i$ and $b_i$ of the second and third columns of each submatrix of A. An example algorithm is as follows:
Initialization:
Choose initial values for $\zeta_1$ and h.
Routine 1:
(i) Determine values for $\zeta_2 = \zeta_1 + h$ and $\zeta_3 = \zeta_1 - h$.
(ii) Solve the following equation for a, b, and c for the $l^{th}$ submatrix:

$$\begin{bmatrix} K & \zeta_1 & 1 \\ K & \zeta_2 & 1 \\ K & \zeta_3 & 1 \end{bmatrix} \begin{bmatrix} c \\ a \\ b \end{bmatrix} = \begin{bmatrix} y_l \\ y_{l+1} \\ y_{l+2} \end{bmatrix} \qquad (10)$$

(iii) Find $\Delta A_{jk} = \{a - a_j | \alpha_{ijk} = \zeta_k, \mu_{ijk} = \zeta_k\}$, for each row k of the submatrix to obtain $\Delta A_j = \{\Delta A_{j1}, \Delta A_{j2}, \Delta A_{j3}\}$.
(iv) Find $\Delta B_{jk} = \{b - b_j | \alpha_{ijk} = \zeta_k, \mu_{ijk} = \zeta_k, \phi_{ijk} = \zeta_k\}$, to obtain $\Delta B_j = \{\Delta B_{j1}, \Delta B_{j2}, \Delta B_{j3}\}$.
(v) Similarly, find $\Delta C_{ijk} = \{c - c_j | \zeta = \zeta_k\}$, to obtain $\Delta C_j = \{\Delta C_{j1}, \Delta C_{j2}, \Delta C_{j3}\}$.
(vi) Next, find the $\zeta_k$ as $\zeta_* = \min(\min(\Delta A), \min(\Delta B), \min(\Delta C))$.
(vii) Evaluate $a_j^* | \alpha_{ijk} = \zeta_*, \mu_{ijk} = \zeta_*$, for all the submatrices.
(viii) Evaluate $b_j^* | \alpha_{ijk} = \zeta_*, \mu_{ijk} = \zeta_*, \phi_{ijk} = \zeta_*$, for all the submatrices.
(ix) Evaluate $c_j^* | \zeta_k = \zeta_*$, for all the submatrices.
(x) Shuffle $x_i$ between $a_j$, $b_j$, and $c_j$ in the order $b_j \to a_j \to c_j$ and reevaluate them for $\zeta_k$ such that $|a_j - a_j^*|$, $|b_j - b_j^*|$, and $|c_j - c_j^*|$ are minimum.
(xi) From the obtained $\zeta_*$, get the specific row of the corresponding submatrix and pass the $a_j$, $b_j$, and $c_j$ to Routine 2.
(xii) The optimized $a_j$, $b_j$, and $c_j$ are saved.
Routine 2:
(i) Given the $a_j$, $b_j$, and $c_j$ of the specific $l^{th}$ submatrix obtained from Routine 1, solve the following equation for $\zeta$:

$$\begin{bmatrix} c_j & a_j & b_j \end{bmatrix} \begin{bmatrix} K \\ \zeta \\ 1 \end{bmatrix} = \begin{bmatrix} y_j \end{bmatrix} \qquad (11)$$

(ii) Reduce h and pass $\zeta$ as $\zeta_1$ to Routine 1 for all the submatrices.

Matrix optimizer 215 performs iterations using Routine 1 and Routine 2 until saturation occurs, when no further shuffling is possible from $b_j$ to $a_j$ to $c_j$. Shuffling in the algorithm plays the role of reducing the number of independent adjustable parameters in the matrix as well as reducing the variance among adjustable parameters in the matrix.

Once matrix optimizer 215 has determined the least complex model matrix, matrix row clusterer 220 groups secondary outputs 150 based on the complexity of their associated model matrix rows. In certain embodiments, matrix optimizer 215 groups secondary outputs 150 based on the number of independent adjustable parameters contained in their associated model matrix rows. In certain other embodiments, matrix optimizer 215 groups secondary outputs 150 based on both the number of independent adjustable parameters contained in their associated model matrix rows and the variance of the independent adjustable parameters contained in their associated model matrix rows compared with the other adjustable parameters in the system, assuming that the differences between pairs of independent adjustable parameters in equation (3) follow a normal distribution, given by:

$$g(\gamma) = \frac{1}{\gamma\sqrt{2\pi}} e^{\frac{\delta^2}{2\gamma^2}}, \qquad (12)$$

where $\alpha \in P$, $\beta \in \{P | \alpha \neq \beta\}$, and $\gamma$ is the variance of the distribution.

In certain embodiments, after error prioritizer 170 has determined the least complex model, error prioritizer 170 may receive additional labelled secondary output data 205 from error detector and labeler 165. For example, error prioritizer 170 may receive additional labeled secondary output data 205 in situations in which defect analysis and remediation tool 105 is operating on secondary outputs 150 while the second system is continuing to generate secondary outputs 150. In certain such embodiments, error prioritizer may determine that the least complex model matrix does not fit the new secondary output data (i.e. a solution no longer exists to the matrix equation). In such embodiments, defect analysis and remediation tool 105 may increase the number of basis functions in the model matrix and search for a new least complex model using the same process as described above.

After grouping secondary outputs 150 based on the complexity of their associated model matrix rows, matrix optimizer 215 then selects secondary outputs for remediation and sends these secondary outputs to user 110 as remediation candidates 175. In certain embodiments, matrix optimizer 215 chooses remediation candidates 175 as the secondary outputs from the set of secondary outputs 150 that have been labeled by error detector and labeler 165 as inaccurate and which are associated with the lowest model complexity, as compared with other secondary outputs from the set of secondary outputs 150 that have also been labeled as inaccurate. In this manner, error prioritizer 170 sends remediation candidates 175 to user 110 that are most likely to have a large impact on other system outputs, under the assumption that the lower the system complexity associated with an error, the larger the impact the error will have on other system outputs.

This disclosure contemplates that in certain embodiments, error prioritizer 170 can operate on secondary outputs 150 that have not been provided to error detector and labeler 165 for labeling. For example, this may be desirable in situations in which primary outputs 145 against which secondary outputs 150 can be compared do not exist. In such embodiments, matrix row clusterer 220 may assume that secondary outputs associated with matrix rows of a level of complexity greater than a set amount may be associated with errors in the system, and send those secondary outputs associated with matrix rows of the lowest level of complexity greater than the set level of complexity to user 110, as remediation candidates 175.

FIG. 3 further illustrates the process by which defect analysis and remediation tool 105 prioritizes secondary outputs of the set of secondary outputs 150 for remediation. In step 305, defect analysis and remediation tool 105 compares each secondary output of the set of secondary outputs 150 to its corresponding primary output of the set of primary outputs 145, and labels those secondary outputs that are equivalent to their corresponding primary outputs as accurate and those secondary outputs that are not equivalent to their corresponding primary outputs as inaccurate. Next, in step 310, defect analysis and remediation tool 105 uses a matrix composed of a set of basis functions to model the system that was used to generate the secondary outputs. In certain embodiments, the basis functions are chosen such that each row of the matrix contains functions of a single, independent adjustable parameter, functions containing an additional two independent adjustable parameters, and functions containing three independent adjustable parameters. Next, at step 315, defect analysis and remediation tool 105 determines that a solution to the matrix equation AX=Y exists, where A is the model matrix, X is a vector of the inputs 135 and the input parameters 140, and Y is a vector of the secondary outputs 150. In certain embodiments, prior to determining that a solution to the matrix equation AX=Y exists, defect analysis and remediation tool 105 may first determine that a solution to the matrix equation AX=Y does not exist. In such embodiments, in response to determining that a solution to the matrix equation AX=Y does not exist, defect analysis and remediation tool 105 doubles both the number of functions containing two independent adjustable parameters and the number of functions containing three independent adjustable parameters in each row of matrix A. Defect analysis and remediation tool 105 further doubles the size of vector X, by including twice the inputs 135 and the input parameters 140 in vector X, and doubles the size of vector Y by including twice the secondary outputs 150 in vector Y. Defect analysis and remediation tool 105 then determines whether a solution to the equation AX=Y exists. If a solution does exist, defect analysis and remediation tool 105 continues to step 320. If a solution does not exist, defect analysis and remediation tool 105 continues to increase the number of basis functions in matrix A until it does determine that a solution to AX=Y exists.

In step 320, defect analysis and remediation tool 105 next reduces the number of independent adjustable parameters in matrix A, by either reducing the number of functions of two adjustable parameters or reducing the number of functions of three adjustable parameters from a row of matrix A. In step 325, defect analysis and remediation tool 105 determines whether a solution to the matrix equation AX=Y continues to exist. If a solution still exists, defect analysis and remediation tool 105 returns to step 320, and further reduces the number of independent adjustable parameters in matrix A.

If defect analysis and remediation tool 105 determines that a solution to the matrix equation AX=Y no longer exists, then in step 330, defect analysis and remediation tool 105 groups the secondary outputs of the set of secondary outputs based on the complexity of their corresponding matrix rows. In certain embodiments, defect analysis and remediation tool 105 groups the secondary outputs based on the number of independent adjustable parameters in their corresponding matrix rows. In certain other embodiments, defect analysis and remediation tool 105 groups the secondary outputs based both on the number of independent adjustable parameters contained in their corresponding matrix rows and the variance of the independent adjustable parameters contained in their corresponding matrix rows compared with the other adjustable parameters in the system, assuming that the differences between pairs of independent adjustable parameters follow a normal distribution.

Modifications, additions, or omissions may be made to method 300 depicted in FIG. 3. Method 300 may include more, fewer, or other steps. For example, steps may be performed in parallel or in any suitable order. While discussed as defect analysis and remediation tool 105 (or components thereof) performing the steps, any suitable component of system 100, such as device(s) 115 for example, may perform one or more steps of the method.

Figure 4:
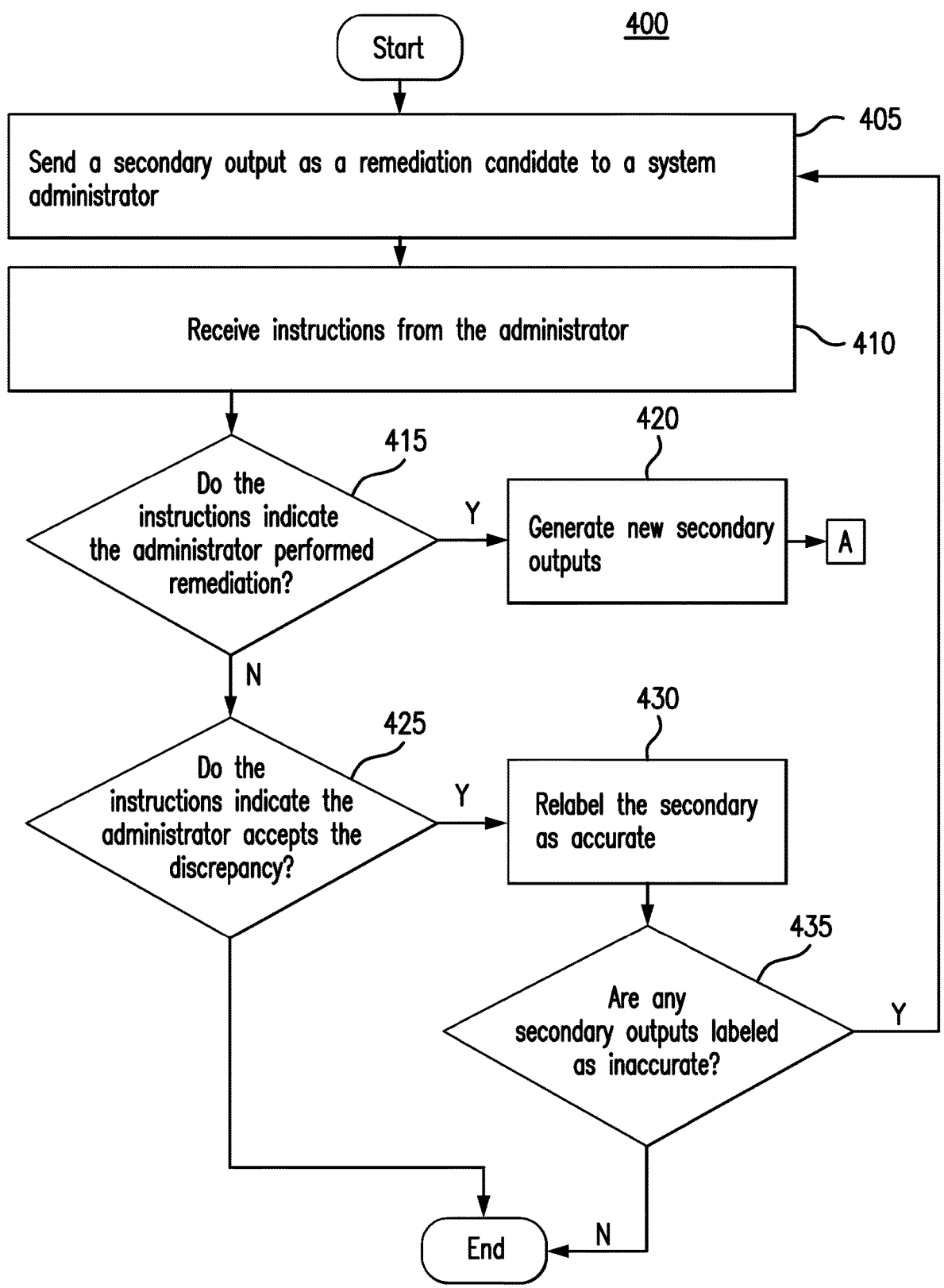
FIG. 4 presents a flowchart illustrating the process by which the defect analysis and remediation tool in the system of FIG. 1 remediates errors in the secondary output data stored in the database of FIG. 1.

FIG. 4 presents a flowchart illustrating the process by which defect analysis and remediation tool 105 remediates errors in the secondary output data 150 stored in database 125. At step 405, defect analysis and remediation tool 105 sends a secondary output of the set of secondary outputs 150 to a system administrator 110 as a remediation candidate 175. Next, at step 410, defect analysis and remediation tool 105 receives instructions back from administrator 110. At step 415, defect analysis and remediation tool 105 determines whether the instructions indicate that the administrator 110 performed remediation on the second system using the remediation candidate 175. If defect analysis and remediation tool 105 determines that the instructions do indicate that the administrator 110 performed remediation, then at step 420, defect analysis and remediation tool 105 generates new secondary outputs 150 using the set of inputs 135 and the set of input parameters 140. Defect analysis and remediation tool 105 then performs the process illustrated in FIG. 3 using the new set of secondary outputs 150.

If defect analysis and remediation tool 105 determines that the instructions do not indicate that the administrator 110 performed remediation, at step 425, defect analysis and remediation tool 105 next determines whether the instructions indicate that the administrator 110 accepted the remediation candidate 175, indicating that it is not associated with an error in the second system. If defect analysis and remediation tool 105 determines that the instructions do indicate that the administrator 110 accepted the remediation candidate 175, then in step 430, defect analysis and remediation tool 105 relabels the remediation candidate 175 as accurate. Finally, in step 435, defect analysis and remediation tool 105 determines whether there are any remaining secondary outputs labeled as inaccurate. If defect analysis and remediation tool 105 determines that there are remaining secondary outputs labeled as inaccurate, defect analysis and remediation tool 105 sends another secondary output of the set of secondary outputs 150 as a remediation candidate 175 to system administrator 110, and the process repeats.

Modifications, additions, or omissions may be made to method 400 depicted in FIG. 3. Method 400 may include more, fewer, or other steps. For example, steps may be performed in parallel or in any suitable order. While discussed as defect analysis and remediation tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a database configured to store:
a set of basis functions comprising a set of first functions, a set of second functions, and a set of third functions, the set of first functions comprising functions of one adjustable parameter, the set of second functions comprising functions of two adjustable parameters, the set of third functions comprising functions of three adjustable parameters;
a set of inputs;
a set of input parameters;
a set of primary outputs obtained from a first system, the set of primary outputs comprising a first primary output, a second primary output, and a third primary output; and
a set of secondary outputs obtained from a second system using the set of inputs and the set of input parameters, the set of secondary outputs comprising a first secondary output, a second secondary output, and a third secondary output, the first secondary output the same as the first primary output, the second secondary output different from the second primary output, and the third secondary output different from the third primary output, wherein the second system contains one or more errors such that if the second system did not contain the one or more errors the first secondary output would be the same as the first primary output, the second secondary output would be the same as the second primary output, and the third secondary output would be the same as the third primary output;
a hardware processor configured to:
compare the first secondary output to the first primary output and label the first secondary output as accurate in response to determining that the first secondary output is the same as the first primary output;
compare the second secondary output to the second primary output and label the second secondary output as inaccurate in response to determining that the second secondary output is different from the second primary output;
compare the third secondary output to the third primary output and label the third secondary output as inaccurate in response to determining that the third secondary output is different from the third primary output;
form a first matrix of basis functions chosen from the set of basis functions to represent the second system, each row of the first matrix including a first number of functions comprising one or more first functions of the set of first functions, one or more second functions of the set of second functions, and one or more third functions of the set of third functions;
form a first set of equations by setting the first matrix multiplied by a first vector comprising the set of inputs and the set of input parameters equal to a second vector comprising the set of secondary outputs;
determine that a first solution to the first set of equations does not exist;
in response to determining that the first solution to the first set of equations does not exist:
form a second matrix of basis functions chosen from the set of basis functions to represent the second system, each row of the second matrix including a second number of basis functions comprising two or more first functions of the set of first functions, two or more second functions of the set of second functions, and two or more third functions of the set of third functions, the second number twice as large as the first number;
form a second set of equations by setting the second matrix multiplied by a third vector comprising the set of inputs, a first copy of the set of inputs, the set of input parameters, and a second copy of the set of input parameters equal to the second vector comprising the set of secondary outputs;
determine that a second solution to the second set of equations does exist;
in response to determining that the second solution to the second set of equations does exist:
remove at least one basis function from a first row of the second matrix, the at least one basis function comprising either a first second function of the set of second functions or a first third function of the set of third functions;
form a third set of equations by setting the second matrix multiplied by the third vector equal to the second vector, wherein setting the first row of the second matrix multiplied by the third vector equal to the second secondary output defines a first equation of the third set of equations;
determine that a third solution to the third set of equations does exist;
remove at least one basis function from a second row of the second matrix, the second row different from the first row, the at least one basis function comprising either a second second function of the set of second functions or a second third function of the set of third functions;
form a fourth set of equations by setting the second matrix multiplied by the third vector equal to the second vector, wherein setting the second row of the second matrix multiplied by the third vector equal to the third secondary output defines a second equation of the fourth set of equations;
determine that a fourth solution to the fourth set of equations does not exist; and
in response to determining that the third solution does exist and that the fourth solution does not exist, send the second secondary output as a remediation candidate to an administrator;
receive a set of instructions from the administrator indicating that remediation was performed; and
generate a second set of secondary outputs from the second system using the set of inputs and the set of input parameters.

2. The apparatus of claim 1, wherein the processor is further configured to receive a subsequent set of instructions from the administrator, the subsequent set of instructions comprising instructions to relabel the second secondary output as accurate.

3. The apparatus of claim 1, wherein the set of basis functions comprises Gaussian basis functions.

4. The apparatus of claim 1, wherein:
   determining that the first solution to the first set of equations does not exist comprises determining that a first iterative solution to the first set of equations does not exist; and
   determining that the second solution to the second set of equations does exist comprises determining that a second iterative solution to the second set of equations does converge.

5. The apparatus of claim 4, wherein determining that the second solution to the second set of equations does exist further comprises rewriting the second set of equations as a matrix equation comprising a new matrix with 3 columns, splitting the new matrix into a set of 3 by 3 submatrices, and performing an iterative process on each submatrix of the set of 3 by 3 submatrices.

6. The apparatus of claim 1, wherein the processor is further configured to:
   in response to determining that the second solution to the second set of equations does exist:
      receive additional inputs and store the additional inputs in the set of inputs;
      receive additional input parameters and store the additional input parameters in the set of input parameters;
      receive additional outputs and store the additional outputs in the set of secondary outputs;
      form a fourth set of equations by setting the second matrix multiplied by a new third vector comprising the set of inputs, a new first copy of the set of inputs, the set of input parameters, and a new second copy of the set of input parameters equal to a new second vector comprising the set of secondary outputs;
      determine that a fifth solution to the fourth set of equations does not exist;
      form a third matrix of basis functions chosen from the set of basis functions to represent the second system, each row of the third matrix including a third number of basis functions comprising three or more first functions of the set of first functions, three or more second functions of the set of second functions, and three or more third functions of the set of third functions, the third number three times as large as the first number;
      form a fifth set of equations by setting the third matrix multiplied by the new third vector equal to the new second vector; and
      determine that a sixth solution to the fifth set of equations does exist.

7. A method comprising:
   comparing a first secondary output of a set of secondary outputs to a first primary output of a set of primary outputs, the set of primary outputs obtained from a first system, the set of secondary outputs obtained from a second system using the set of inputs and the set of input parameters, wherein:
      the set of primary outputs comprises the first primary output, a second primary output, and a third primary output;
      the set of secondary outputs comprises the first secondary output, a second secondary output, and a third secondary output;
      the first secondary output is the same as the first primary output;
      the second secondary output is different from the second primary output;
      the third secondary output is different from the third primary output; and
      the second system contains one or more errors such that if the second system did not contain the cone or more errors, the first secondary output would be the same as the first primary output, the second secondary output would be the same as the second primary output, and the third secondary output would be the same as the third primary output;
   labeling the first secondary output as accurate in response to determining that the first secondary output is the same as the first primary output;
   comparing the second secondary output of the set of secondary outputs to the second primary output of the set of primary outputs, and labeling the second secondary output as inaccurate in response to determining that the second secondary output is different from the second primary output;
   comparing the third secondary output of the set of secondary outputs to the third primary output of the set of primary outputs and labeling the third secondary output as inaccurate in response to determining that the third secondary output is different from the third primary output;
   forming a first matrix of basis functions chosen from a set of basis functions to represent the second system, each row of the first matrix including a first number of functions comprising one or more first functions of a set of first functions, one or more second functions of a set of second functions, and one or more third functions of a set of third functions, the set of first functions comprising functions of one adjustable parameter, the set of second functions comprising functions of two adjustable parameters, the set of third functions comprising functions of three adjustable parameters;
   forming a first set of equations by setting the first matrix multiplied by a first vector comprising the set of inputs and the set of input parameters equal to a second vector comprising the set of secondary outputs;
   determining that a first solution to the first set of equations does not exist;
   in response to determining that the first solution to the first set of equations does not exist:
      forming a second matrix of basis functions chosen from the set of basis functions to represent the second system, each row of the second matrix including a second number of basis functions comprising two or more first functions of the set of first functions, two or more second functions of the set of second functions, and two or more third functions of the set of third functions, the second number twice as large as the first number;
      forming a second set of equations by setting the second matrix multiplied by a third vector comprising the set of inputs, a first copy of the set of inputs, the set of input parameters, and a second copy of the set of input parameters equal to the second vector comprising the set of secondary outputs;
      determining that a second solution to the second set of equations does exist;
      in response to determining that the second solution to the second set of equations does exist:

removing at least one basis function from a first row of the second matrix, the at least one basis function comprising either a first second function of the set of second functions or a first third function of the set of third functions;

forming a third set of equations by setting the second matrix multiplied by the third vector equal to the second vector, wherein setting the first row of the second matrix multiplied by the third vector equal to the second secondary output defines a first equation of the third set of equations;

determining that a third solution to the third set of equations does exist;

removing at least one basis function from a second row of the second matrix, the second row different from the first row, the at least one basis function comprising either a second second function of the set of second functions or a second third function of the set of third functions;

forming a fourth set of equations by setting the second matrix multiplied by the third vector equal to the second vector, wherein setting the second row of the second matrix multiplied by the third vector equal to the third second secondary output defines a second equation of the fourth set of equations;

determining that a fourth solution to the fourth set of equations does not exist; and in response to determining that the third solution does exist and that the fourth solution does not exist, sending the second secondary output as a remediation candidate to an administrator;

receiving a set of instructions from the administrator indicating that remediation was performed; and generating a second set of secondary outputs from the second system using the set of inputs and the set of input parameters.

8. The method of claim 7, further comprising receiving a subsequent set of instructions from the administrator, the subsequent set of instructions comprising instructions to relabel the second secondary output as accurate.

9. The method of claim 7, wherein the set of basis functions comprises Gaussian basis functions.

10. The method of claim 7, wherein:
determining that the first solution to the first set of equations does not exist comprises determining that a first iterative solution to the first set of equations does not exist; and
determining that the second solution to the second set of equations does exist comprises determining that a second iterative solution to the second set of equations does converge.

11. The method of claim 10, wherein determining that the second solution to the second set of equations does exist further comprises rewriting the second set of equations as a matrix equation comprising a new matrix with 3 columns, splitting the new matrix into a set of 3 by 3 submatrices, and performing an iterative process on each submatrix of the set of 3 by 3 submatrices.

12. The method of claim 7, further comprising:
in response to determining that the second solution to the second set of equations does exist:
receiving additional inputs and storing the additional inputs in the set of inputs;
receiving additional input parameters and storing the additional input parameters in the set of input parameters;
receiving additional outputs and storing the additional outputs in the set of secondary outputs;
forming a fourth set of equations by setting the second matrix multiplied by a new third vector comprising the set of inputs, a new first copy of the set of inputs, the set of input parameters, and a new second copy of the set of input parameters equal to a new second vector comprising the set of secondary outputs;
determining that a fifth solution to the fourth set of equations does not exist;
forming a third matrix of basis functions chosen from the set of basis functions to represent the second system, each row of the third matrix including a third number of basis functions comprising three or more first functions of the set of first functions, three or more second functions of the set of second functions, and three or more third functions of the set of third functions, the third number three times as large as the first number;
forming a fifth set of equations by setting the third matrix multiplied by the new third vector equal to the new second vector; and
determining that a sixth solution to the fifth set of equations does exist.

13. A system comprising:
a storage element operable to store:
a set of Gaussian basis functions comprising a set of first functions, a set of second functions, and a set of third functions, the set of first functions comprising functions of one adjustable parameter, the set of second functions comprising functions of two adjustable parameters, the set of third functions comprising functions of three adjustable parameters;
a set of inputs;
a set of input parameters;
a set of primary outputs obtained from a first system, the set of primary outputs comprising a first primary output, a second primary output, and a third primary output; and
a set of secondary outputs obtained from a second system using the set of inputs and the set of input parameters, the set of secondary outputs comprising a first secondary output, a second secondary output, and a third secondary output, the first secondary output the same as the first primary output, the second secondary output different from the second primary output, and the third secondary output different from the third primary output, wherein the second system contains one or more errors such that if the second system did not contain the one or more errors the first secondary output would be the same as the first primary output, the second secondary output would be the same as the second primary output, and the third secondary output would be the same as the third primary output;
a processing element operable to:
compare the first secondary output to the first primary output and label the first secondary output as accurate in response to determining that the first secondary output is the same as the first primary output;
compare the second secondary output to the second primary output and label the second secondary output as inaccurate in response to determining that the second secondary output is different from the second primary output;
compare the third secondary output to the third primary output and label the third secondary output as inaccurate in response to determining that the third secondary output is different from the third primary output;

form a first matrix of basis functions chosen from the set of basis functions to represent the second system, each row of the first matrix including a first number of functions comprising one or more first functions of the set of first functions, one or more second functions of the set of second functions, and one or more third functions of the set of third functions;

form a first set of equations by setting the first matrix multiplied by a first vector comprising the set of inputs and the set of input parameters equal to a second vector comprising the set of secondary outputs;

determine that a first solution to the first set of equations does not exist;

in response to determining that the first solution to the first set of equations does not exist:

form a second matrix of basis functions chosen from the set of basis functions to represent the second system, each row of the second matrix including a second number of basis functions comprising two or more first functions of the set of first functions, two or more second functions of the set of second functions, and two or more third functions of the set of third functions, the second number twice as large as the first number;

form a second set of equations by setting the second matrix multiplied by a third vector comprising the set of inputs, a first copy of the set of inputs, the set of input parameters, and a second copy of the set of input parameters equal to the second vector comprising the set of secondary outputs;

determine that a second solution to the second set of equations does exist;

in response to determining that the second solution to the second set of equations does exist:

remove at least one basis function from a first row of the second matrix, the at least one basis function comprising either a first second function of the set of second functions or a first third function of the set of third functions;

form a third set of equations by setting the second matrix multiplied by the third vector equal to the second vector, wherein setting the first row of the second matrix multiplied by the third vector equal to the second secondary output defines a first equation of the third set of equations;

determine that a third solution to the third set of equations does exist;

remove at least one basis function from a second row of the second matrix, the second row different from the first row, the at least one basis function comprising either a second second function of the set of second functions or a second third function of the set of third functions;

form a fourth set of equations by setting the second matrix multiplied by the third vector equal to the second vector, wherein setting the second row of the second matrix multiplied by the third vector equal to the third secondary output defines a second equation of the fourth set of equations;

determine that a fourth solution to the fourth set of equations does not exist; and in response to determining that the third solution does exist and that the fourth solution does not exist, send the second secondary output as a remediation candidate to an administrator;

remove at least one basis function from a second row of the second matrix, the at least one basis function comprising either a second second function of the set of second functions or a second third function of the set of third functions;

form a third set of equations by setting the second matrix multiplied by the third vector equal to the second vector, wherein setting the first row of the second matrix multiplied by the third vector equal to the second secondary output defines a first equation of the third set of equations and setting the second row of the second matrix multiplied by the first vector equal to the third secondary output defines a second equation of the third set of equations;

determine that a third solution to the first equation exists;

determine that a fourth solution to the second equation does not exist; and in response to determining that the third solution to the first equation exists and that the fourth solution to the second equation does not exist, send the second secondary output as a remediation candidate to an administrator;

receive a set of instructions from the administrator indicating that remediation was performed; and generate a second set of secondary outputs from the second system using the set of inputs and the set of input parameters.

14. The system of claim 13, wherein the processing element is further operable to receive a subsequent set of instructions from the administrator, the subsequent set of instructions comprising instructions to relabel the second secondary output as accurate in response to a determination by the administrator to accept the second secondary output.

15. The system of claim 13, wherein:

determining that the first solution to the first set of equations does not exist comprises determining that a first iterative solution to the first set of equations does not exist; and determining that the second solution to the second set of equations does exist comprises determining that a second iterative solution to the second set of equations does converge.

16. The system of claim 15, wherein determining that the second solution to the second set of equations does exist further comprises rewriting the second set of equations as a matrix equation comprising a new matrix with 3 columns, splitting the new matrix into a set of 3 by 3 submatrices, and performing an iterative process on each submatrix of the set of 3 by 3 submatrices.

17. The system of claim 13, wherein the processing element is further operable to:

in response to determining that the second solution to the second set of equations does exist:

receive additional inputs and store the additional inputs in the set of inputs;

receive additional input parameters and store the additional input parameters in the set of input parameters;

receive additional outputs and store the additional outputs in the set of secondary outputs;

form a fourth set of equations by setting the second matrix multiplied by a new third vector comprising the set of inputs, a new first copy of the set of inputs, the set of input parameters, and a new second copy of the set of input parameters equal to a new second vector comprising the set of secondary outputs;

determine that a fifth solution to the fourth set of equations does not exist;

form a third matrix of basis functions chosen from the set of basis functions to represent the second system, each row of the third matrix including a third number of basis functions comprising three or more first functions of the set of first functions, three or more second functions of the set of second functions, and three or more third functions of the set of third functions, the third number three times as large as the first number;

form a fifth set of equations by setting the third matrix multiplied by the new third vector equal to the new second vector; and determine that a sixth solution to the fifth set of equations does exist.

* * * * *